(12) United States Patent
Thoma

(10) Patent No.: US 9,914,251 B2
(45) Date of Patent: Mar. 13, 2018

(54) PLASTIC BOARD AND METHOD FOR PRODUCING SUCH A BOARD

(71) Applicant: Rotho Kunststoff AG, Wurenlingen (CH)

(72) Inventor: Christian Thoma, Albbruck (DE)

(73) Assignee: Rotho Kunststoff AG, Würenlingen (CH)

( * ) Notice: Subject to any disclaimer, the term of this patent is extended or adjusted under 35 U.S.C. 154(b) by 11 days.

(21) Appl. No.: 14/693,988

(22) Filed: Apr. 23, 2015

(65) Prior Publication Data

US 2015/0306802 A1  Oct. 29, 2015

(30) Foreign Application Priority Data

Apr. 23, 2014  (EP) .................................... 14165583

(51) Int. Cl.
*B29C 45/16* (2006.01)
*A47J 47/00* (2006.01)
(Continued)

(52) U.S. Cl.
CPC ......... *B29C 45/1642* (2013.01); *A47J 47/005* (2013.01); *B29C 45/0062* (2013.01); *B29C 45/1615* (2013.01); *B29C 65/565* (2013.01); *B29C 66/126* (2013.01); *B29C 66/21* (2013.01); *B29C 66/54* (2013.01); *B29C 66/73921* (2013.01); *B29D 99/0021* (2013.01); *B32B 3/06* (2013.01); *B32B 3/08* (2013.01); *B32B 3/20* (2013.01); *B32B 3/28* (2013.01); *B32B 3/30* (2013.01); *B32B 7/08* (2013.01); *B32B 7/12* (2013.01); *B32B 27/08* (2013.01); *B32B 27/32* (2013.01); *B29C 45/14467* (2013.01); *B29C 65/1412* (2013.01); *B29C 65/1432* (2013.01);
(Continued)

(58) Field of Classification Search
CPC . A47J 47/005; B32B 3/28; B32B 3/30; B32B 27/08; B32B 27/32; B29C 45/0062; B29C 66/54; B29C 2045/14532; B29C 45/1642; B29C 45/1704; B29C 2045/1722; B29C 2045/1715; B29C 2045/1728; B29C 65/565; B29C 66/126; B29D 99/021
USPC ....................................................... 264/261
See application file for complete search history.

(56) References Cited

FOREIGN PATENT DOCUMENTS

| FR | 2889933 | 8/2005 |
|----|---------|--------|
| JP | 7223638 | 8/1995 |

(Continued)

OTHER PUBLICATIONS

Translation of KR20140000401; published Jan. 20, 2014.*

*Primary Examiner* — Catherine A Simone
(74) *Attorney, Agent, or Firm* — Volpe and Koenig, P.C.

(57) ABSTRACT

A method for producing a plastic board with an upper side 1, an underside 2 and at least one edge surface 3 by an injection-molding technique, and also a corresponding plastic board are provided. In the method, a first half 6, which forms at least the upper side of the plastic board, and a second half 7, which forms at least the underside of the plastic board, are injection-molded. Then, the first half and the second half are joined together in order to form a plastic board with an upper side and an underside. The two halves being formed in such a way that at least one cavity forms between the halves when they are joined together. The two halves are fixed onto one another, preferably by molding on a connecting component 5 of plastic.

10 Claims, 2 Drawing Sheets

(51) Int. Cl.
*B32B 7/12* (2006.01)
*B32B 27/08* (2006.01)
*B32B 3/06* (2006.01)
*B32B 27/32* (2006.01)
*B32B 3/30* (2006.01)
*B32B 7/08* (2006.01)
*B29C 65/56* (2006.01)
*B29C 65/00* (2006.01)
*B29C 45/00* (2006.01)
*B29D 99/00* (2010.01)
*B32B 3/08* (2006.01)
*B32B 3/20* (2006.01)
*B32B 3/28* (2006.01)
*B29L 24/00* (2006.01)
*B29L 7/00* (2006.01)
*B29C 45/14* (2006.01)
*B29C 65/14* (2006.01)
*B29C 65/72* (2006.01)
*B29C 69/00* (2006.01)
*B29L 31/00* (2006.01)
*B29L 9/00* (2006.01)

(52) U.S. Cl.
CPC ........ *B29C 65/72* (2013.01); *B29C 66/24244* (2013.01); *B29C 66/305* (2013.01); *B29C 66/71* (2013.01); *B29C 66/8322* (2013.01); *B29C 69/00* (2013.01); *B29C 2045/14532* (2013.01); *B29L 2007/002* (2013.01); *B29L 2009/00* (2013.01); *B29L 2024/00* (2013.01); *B29L 2031/762* (2013.01); *B32B 2250/02* (2013.01); *B32B 2250/242* (2013.01); *B32B 2509/00* (2013.01)

(56) References Cited

FOREIGN PATENT DOCUMENTS

| | | | |
|---|---|---|---|
| JP | 10243884 | 9/1998 | |
| KR | 20140000401 U | * 1/2014 | ............ A47J 47/005 |
| WO | 2007026107 | 3/2007 | |

* cited by examiner

PLASTIC BOARD AND METHOD FOR PRODUCING SUCH A BOARD

INCORPORATION BY REFERENCE

The following documents are incorporated herein by reference as if fully set forth: European Patent Application No. 14 165 583.7, filed Apr. 23, 2014.

BACKGROUND

The present invention relates to a plastic board, formed of injection-molded plastic, with an upper side, an underside and a peripheral edge surface. In addition, the present invention relates to a method for producing such a plastic board by an injection-molding technique.

The main application area for a plastic board according to the present invention is for the household and kitchen, food retailers and food production companies, where such plastic boards are used as cutting boards. Cutting boards of plastic have the great advantage that their surfaces have characteristics similar to wood surfaces in terms of their benign effect on knife blades, but can meet much higher requirements for hygiene in comparison. Cutting boards of plastic are accordingly in widespread use. They are usually produced from polypropylene or some other thermoplastic.

Plastic boards that are to be used in particular as cutting boards have a thickness of typically 8 to 10 mm, in order to ensure sufficient intrinsic stability when cutting food and the like. To allow a plastic product with such a wall thickness to be injection-molded, a disproportionately long cycle time is necessary.

In an injection-molding machine, plastic is plasticized and injected under pressure into an injection-molding tool. In the injection-molding tool, the plastic transitions back into the solid state again as a result of cooling down, and, after opening of the injection-molding tool, is removed as a finished part. Before the demolding, the plastic must however have solidified completely, in order to ensure dimensional accuracy of the finished part. In the case of thick-walled molds, this cooling process of course takes a disproportionately long time.

In the case of thick-walled sheet-like products, such as the plastic board in question, there is additionally the risk of warping after demolding, if the demolding takes place when the material has not cooled down sufficiently. Especially in the case of the preferred area of use as a cutting board, it is however of great importance that warping of the same is avoided. This is so because a cutting board must be absolutely flat in order for it not to wobble when it is being used.

In order to produce flat cutting boards in the necessary thickness of typically at least 8 mm by the injection-molding process, it is therefore necessary to leave the plastic that is forced into the injection-molding tool in the injection-molding tool for an extraordinary long time in order in particular for it to cool down substantially there before the finished product is demolded. In the case of cutting boards of polypropylene with a thickness of 8 mm that are demolded flat and not intended to warp, cycle times of typically approximately 6 minutes therefore result. By contrast, cycle times of injection-molded plastic household and kitchen containers are for example of the order of half a minute.

JP H10-243 884 A has disclosed a plastic board that is made up of two injection-molded halves. Both halves each have distributed over their surface area stabilizing elements that are arranged in an intermediate space between the two halves. The intermediate space is otherwise substantially unfilled. When the two halves are joined together, the stabilizing elements are placed one on top of the other and connected to one another in a material-bonded manner, in order as a result to fix the two halves to one another.

According to this reference, a method for producing a plastic board with an upper side, an underside and a peripheral edge surface by the injection-molding technique is carried out in such a way that a first half, which comprises at least the upper side of the plastic board, and a second half, which comprises at least the underside of the plastic board, are injection-molded. These two halves are then joined together, in order to form a plastic board with an upper side and an underside, the two halves being formed in such a way that at least one cavity forms between the halves when they are joined together. The two halves are fixed onto one another in order to complete the plastic board.

Accordingly, the plastic board according to the invention is formed substantially of an injection-molded first half, which comprises at least the upper side of the plastic board, and an injection-molded second half, which comprises at least the underside of the plastic board, the two halves being put together and fixed to one another. Between the two halves there is formed at least one cavity.

With these measures, the plastic board can be produced from two halves, the wall thicknesses of which are much smaller than the thickness of the finished plastic board. Accordingly, a very much shorter cycle time is required for the production of the two halves than when the plastic board is produced "in one piece" in a single injection-molding operation. Even if the required time for the joining together of the two halves of the plastic board according to the invention at the same time increases, a significantly shorter cycle time than was previously possible in the prior art is still obtained.

Then there is also the fact that the plastic board requires less material than a plastic board that is produced in a single injection-molding operation; this is so because the cavity, or possibly multiple cavities, form(s) a volume of the plastic board for which no plastic has to be used.

SUMMARY

The present invention is based on the object of providing a method for producing a plastic board by the injection-molding technique with further reduced cycle times and also a plastic board of injection-molded plastic that can be produced by such a method.

This object is achieved by a method and also by a plastic board with one or more features of the invention. Preferred developments of the method and advantageous configurations of the plastic board according to the invention are described below and in the claims.

The fixing of the two halves of the plastic board according to the invention takes place within the scope of the present invention accordingly in an injection-molding tool, to be precise by molding a connecting component of plastic onto the two halves. This connecting component may be formed of the same material as the two halves or as one of the two halves, but it is preferably a plastic which, due to its flow behavior, can be easily processed in the injection-molding process and for example can also be easily colored throughout, since the connecting component of course does not have to meet the same high requirements for stability and impact strength as the upper side and the underside of the plastic board. For a plastic board according to the invention that is used as a cutting board for food, it would for example be advantageous to produce the two halves from polypropylene, while the connecting component is formed of a thermoplastic polyethylene.

The molding of a connecting component onto the two halves in an injection-molding tool makes it possible for the two halves of the plastic board to be fixed to one another quickly, securely and in an automated manner and ensures a material-bonded connection of all the component parts of the plastic board according to the invention. The halves are preferably placed one on top of the other in such a way that the connecting component is molded around the periphery onto a web in the region of the edge surface that likewise substantially runs around peripherally, in order to interconnect and outwardly cover the web edges at which the two halves meet one another, so that the cavity between the two halves is outwardly sealed. For this, it is advantageous if the peripheral web is inwardly set back somewhat with respect to the outer edges of the upper side and the underside of the plastic board, so that the connecting component can fill the clear space produced as a result between the outer edges of the upper side and the underside.

Alternatively or in addition, the two halves of the plastic board according to the invention may be formed, or have been formed, in such a way that, when they are joined together, they form between them channels which, during the molding on of the connecting component of plastic, are flowed through and substantially filled by this connecting component. Channels filled in this way, which run between the upper side and the underside of the plastic board in the interior thereof, firstly increase the surface area, and consequently the strength, of the material-bonded connection between the two halves on the one hand and the connecting component on the other hand, and secondly also increase the mechanical stability of the plastic board, which is intended not to flex during use. Such channels may also be formed by webs on the two halves.

In order to increase further the mechanical stability of the plastic board, while a cavity or multiple cavities is/are nevertheless present in its interior, it is preferred to mold onto the two halves, distributed over their surface area, stabilizing elements which, when the two halves are joined together, mutually engage in one another or, in the simplest case, come to lie one on top of the other, and thus support the two halves with respect to one another.

Engaging in one another, the stabilizing elements distributed over the surface area may be pressed together in order not only to increase the stability of the finished plastic board but also to fix the two halves to one another. This relieves the connecting component, which is then for example substantially responsible for the outward sealing of the cavity between the two halves of the plastic board, which facilitates the optimized choice of a corresponding material.

As an alternative or in addition to pressing, the fixing of the two halves by means of the stabilizing elements may be performed by connecting the stabilizing elements of the two halves in a material-bonded manner. This may for example involve making the stabilizing elements begin to melt before the joining together of the two halves, for example via an infrared heater, which produces the corresponding temperatures within a few seconds. Making them begin to melt has the effect that the respective stabilizing elements are then fused together during the fixing of the two halves to one another.

Especially for use as a cutting board, the plastic board according to the invention is advantageously configured in such a way that its upper side and its underside are produced as uninterrupted over the entire surface area. However, this is not necessarily the case within the scope of the present invention.

The two halves may be identically formed, so that, if need be, they can be produced one after the other in one and the same injection-molding machine. However, it is also possible within the scope of the present invention that the two halves are differently formed, for example in such a way that the first half is merely formed as a panel, while the second half forms the underside and four edge surfaces. Similarly, the two halves of the plastic board according to the invention may be produced from the same material or from different materials.

Preferably, the two halves of the plastic board according to the invention are formed, or have been formed, in such a way that they at least partially butt against one another in the region of the edge surface of the plastic board when they are joined together, and thereby form a web which substantially runs peripherally along the edge surface and with which at least one cavity between the two halves is delimited outwardly toward the edge surface. This edge surface then runs continuously around the periphery when the plastic board is of a round or rounded form, whereas, when the plastic board is formed with a rectangular basic shape, it consists of four partial sections, that is to say two long partial edge surfaces and two short partial edge surfaces.

The preferably present web, which is formed as substantially running around peripherally, offers the advantage of allowing the two halves to be easily fixed to one another at this location, and possibly a cavity inside the plastic board that is delimited by the web to be outwardly sealed. Especially in the case where the plastic board according to the invention is used as a cutting board for processing food, such sealing of the cavity is important for reasons of hygiene.

The edge surface of the plastic board according to the invention may however also be interrupted, for example by openings of channels that are formed inside the plastic board and divide the cavity between the two halves into multiple partial cavities.

In particular for use as a cutting board, the plastic board according to the invention may be provided with at least one gripping opening, which penetrates both the upper side and the underside of the plastic board. Within the scope of the invention, this gripping opening is treated as part of the edge surface or as a second edge surface, running peripherally around the gripping opening, and in this sense may for example likewise be provided with a substantially peripheral web, which leaves a clear space between the upper side and the underside of the plastic board in that the web is arranged set back somewhat into the interior of the plastic board, this clear space then preferably likewise being filled by the connecting component.

BRIEF DESCRIPTION OF THE DRAWINGS

An exemplary embodiment of a plastic board configured according to the invention, on the basis of which an exemplary embodiment of a method configured according to the invention is also evident, is described and explained in more detail below with reference to the accompanying drawings, in which.

DETAILED DESCRIPTION OF THE PREFERRED EMBODIMENTS

Figure 1:
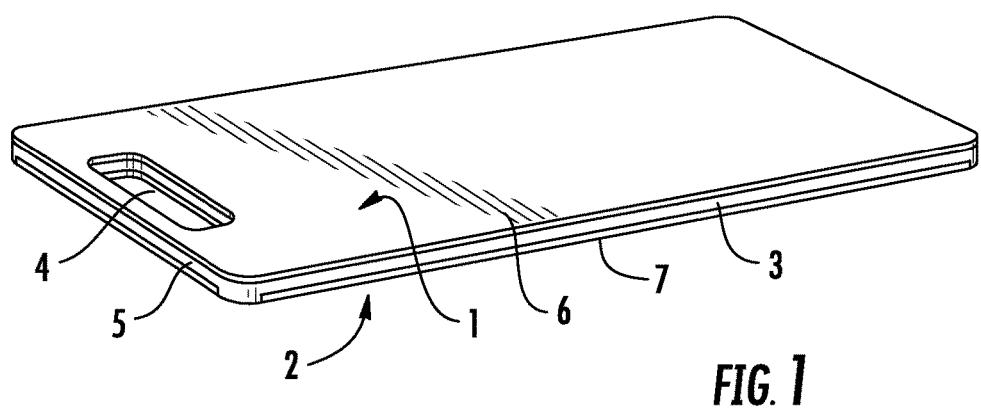
FIG. 1 shows a plastic board configured according to the invention in a perspective view.

FIG. 1 shows an exemplary embodiment of a plastic board according to the invention, configured as a cutting board, in a perspective view. An upper side 1, which is suitable in particular for cutting food, an underside 2 and also a peripheral edge surface 3, made up of four sections, can be seen. The plastic board shown here has a thickness of about 8 mm. On the short side of the rectangular basic shape that is shown on the left, a gripping opening 4 is provided, to allow the plastic board to be more easily gripped and securely held.

According to the invention, the plastic board shown here is formed of a first half 6, which comprises the upper side 1, and a second half 7, which comprises the underside 2. The two halves 6, 7 abut against one another peripherally at the edge surface 3, which is evident more specifically in the representations described below. Molded onto the peripheral edge surface 3 is a connecting component 5, which in the present case is colored through, which sets it apart in terms of color from the first half 6 and the second half 7.

Figure 2:
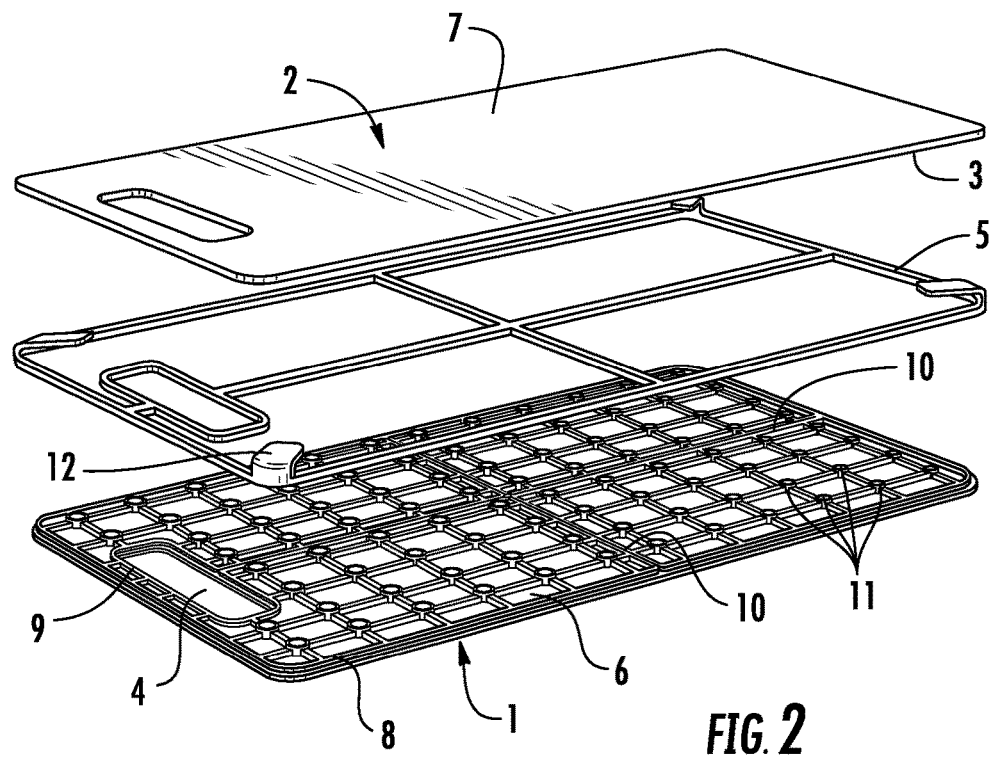
FIG. 2 shows the plastic board from FIG. 1, but in an exploded representation.

FIG. 2 is a schematic representation, once again in perspective, of the plastic board from FIG. 1 having been separated into its three separate injection-molded parts in an exploded representation. In this representation, the first half 6 with the upper side 1 of the plastic board is arranged at the bottom, while the second half 7 with the underside 2 lies at the top here. It can be seen from the first half 6 that it is provided in the region of the edge surface 3 with an inwardly drawn-in web 8. Between this web 8 and the outer edge of the upper side 1, space has been created for the connecting component 5. According to the invention, this is molded onto the first and second halves 6, 7 that have been placed one on top of the other, so that, as can be seen in FIG. 2, there forms a volume of the connecting component 5 that runs peripherally around the edge surface 3.

The web 8 in the region of the edge surface 3 has a counterpart at the gripping opening 4 in the form of the gripping opening web 9. This gripping opening web 9 is also set back with respect to the edge of the upper side 1, to create space for the connecting component 5.

The web 8 and also the gripping opening web 9 have interruptions, in which there opens out a channel 10, which extends in the form of a cross through the interior of the put-together first and second halves 6, 7. It can accordingly be seen in FIG. 2 that, when it is molded on, the connecting component 5 has not only become distributed peripherally around the edge surface 3, but has also flowed into the channel 10 and filled it and has also flowed around the gripping opening 4.

As is evident from FIG. 2, the connecting component 5 connects the two halves 6, 7 of the plastic board in a material-bonded manner not only along the peripheral edge surface 3 but also in a channel 10 running here in the form of a cross through the interior of the plastic board, which ensures the strength of the connection. The peripheral connecting component 5 particularly also outwardly seals the cavity that forms between the first half 6 and the second half 7 when the two halves 6, 7 are put together, which is directly evident from FIG. 2. Strictly speaking, there are four partial cavities, which are separated from one another by the channel 10.

Figure 3:
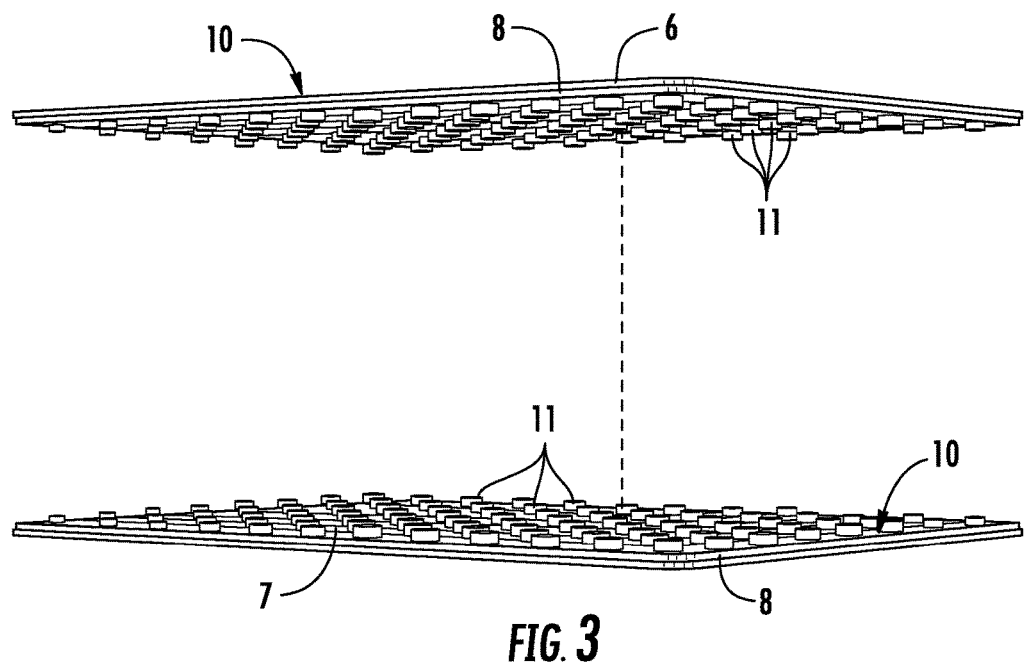
FIG. 3 shows an intermediate step in the production of the plastic board according to FIGS. 1 and 2.

As can likewise be seen in FIG. 2, but can be seen better in FIG. 3, both the first half 6 and the second half 7 are provided, distributed over their surface area, with stabilizing elements 11, which respectively meet one another when the first and second halves 6, 7 are placed one on top of the other, and thus prevent the upper side 1 and/or the underside 2 from yielding or flexing under pressure in spite of the cavity formed between the two halves 6, 7. In the present case, the stabilizing elements 11 are formed of hollow-cylindrical nubs, which to a certain degree enter into one another and support one another. The hollow-cylindrical configuration makes it possible that the stabilizing elements 11 are also formed with thin walls, so that, because they are formed with thin walls throughout, having a wall thickness of typically less than 2 mm, the two halves 6, 7 can be injection-molded with advantageously short cycle times.

Figure 4:
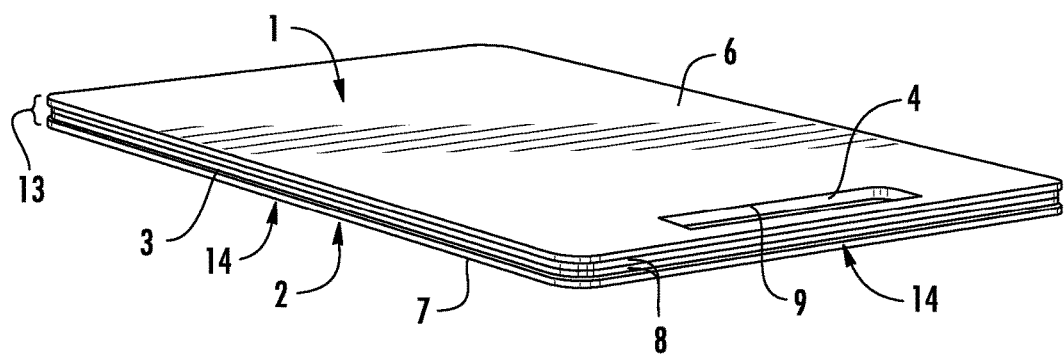
FIG. 4 shows an intermediate step in the production of the plastic board according to FIGS. 1 and 2.

After the injection-molding of the two halves 6, 7, which are shown in FIG. 3 and are formed identically apart from the stabilizing elements 11, for which reason the web 8 is formed half by the first half 6 and half by the second half 7, according to the invention the two halves 6, 7 are placed one on top of the other in order to place them into a further injection-molding tool, in which the connecting component 5 is molded on. This intermediate step is shown by FIG. 4: here, the first half 6 with the upper side 1 and the second half 7 with the underside 2 have been placed one on top of the other. In the region of the peripheral edge surface 3, the web 8 that is formed half each by the two halves 6, 7 is inwardly offset, so that between the outer edges of the upper side 1 and the underside 2 there forms an open space 13 for the connecting component 5. A corresponding arrangement is provided at the gripping opening 4: there, the gripping opening web 9 is inwardly offset, to create space for the connecting component 5, as can be seen more specifically in FIG. 2.

By way of openings 14 of the channel 10 in the edge surface 3, when it is molded on, the connecting component 5 also flows into the channel 10 and fills it substantially completely.

The peripheral web 8 and also the delimitations of the channel 10 are preferably formed as relatively impermeable, so that the connecting component 5 cannot penetrate into the cavity behind the web 8. Depending on the material that is used for the connecting component 5, however, it is not critical if the web 8 is not completely closed in a liquid-tight manner. It is also not absolutely necessary for the strength of the connection between the two halves 6, 7 of the plastic board and the stability of the same that the channel 10 is filled by the connecting component 5 completely.

In the method step represented in FIG. 4, the two halves 6, 7 are pressed against one another, which preferably takes place in the injection-molding tool for the connecting component 5. Due to this pressing of one onto the other, the stabilizing elements 11 of the two halves 6, 7 are respectively pressed into one another, and thus pressed together, so that the pressing together of the connecting elements 11 alone ensures secure fixing of the two halves 6, 7 to one another. In order to carry out the fixing with an even more lasting effect, the stabilizing elements 11 may be made to begin melting before the two halves 6, 7 are joined together (FIG. 3), for example by means of infrared heaters, so that, during the joining together, the stabilizing elements 11 are not only pressed together while engaging in one another, but are fused together, that is to say connected to one another in a material-bonded manner.

As finally FIG. 2 shows and FIG. 1 indicates, in the present exemplary embodiment the connecting component 5 is molded on in such a way that at the corners of the underside 2 it extends over the underside 2, in order to form indicator elements 12. Since in the present exemplary embodiment the connecting component 5 is formed of through-colored thermoplastic polyethylene, while the first half 6 and the second half 7 are formed from white polypropylene, an effect of being set apart in terms of color is obtained both at the edge surface 3 and at the corners of the underside 2, which can be identified at first glance as the underside 2 on account of the indicator elements 12. This can be used as a design element, but it may also have the effect of an indicator, to allow the upper side 1 of the plastic board to be distinguished from the underside 2. This may be important for example if the upper side 1 and the underside 2 are produced from different plastics materials.

The cycle times of all three injection-molding steps, for the injection-molding of the first half 6, for the injection-molding of the second half 7—which is preferably performed at the same time—and also for the molding on of the connecting component 5, plus the handling times between the individual injection-molding steps, are significantly shorter than the cycle time that is needed for the injection-molding of a solid plastic board of the same dimensions, since, as mentioned at the beginning, because of the great material thickness, the solid board requires disproportionally long cooling times in the injection-molding tool to allow it to be demolded without warping after demolding.

At the same time, because of the cavities in it, far less material has to be used for the production of the present plastic board, without this being at the expense of stability. The present invention therefore makes it possible in particular to produce cutting boards for food processing by the injection-molding process with shorter cycle times and lower material costs than previously. At the same time, the separate molding-on of the connecting component makes it possible to provide design elements by way of setting it apart in terms of color and the like.

The invention claimed is:

1. A method for producing a plastic board comprising an upper side (1), an underside (2) and at least one edge surface (3) by injection-molding, the method comprising:
    injection-molding a first half (6), which comprises at least the upper side (1) of the plastic board,
    injection-molding a second half (7), which comprises at least the underside (2) of the plastic board,
    joining together the first and second halves (6, 7), to form a plastic board with the upper side (1) and the underside (2), with the first and second halves abutting one another peripherally to define an edge surface,
    forming the two halves (6, 7) in such a way that at least one cavity and channels (10) are formed between the halves (6, 7) when they are joined together, and
    fixing the two halves (6, 7) to one another at least partially by a separate injection molding of a connecting component (5) of plastic at least partially into the channels (10) between the two halves (6, 7) in an injection-molding tool, the connecting component being injected into said channels such that the channels (10) are filled by the connecting component (5).

2. The method as claimed in claim 1, further comprising forming the two halves (6, 7) such that the halves (6, 7) at least partially abut against one another in a region of the edge surface (3) of the plastic board when they are joined together, and thereby form a web (8) which substantially extends peripherally along the edge surface (3) and with which at least one cavity between the two halves (6, 7) is delimited outwardly toward the edge surface (3).

3. The method as claimed in claim 2, further comprising injection molding the connecting component (5) at least in the region of the edge surface (3) peripherally onto the substantially peripherally extending web (8), to outwardly seal the at least one cavity between the two halves (6, 7).

4. The method as claimed in claim 1, further comprising molding stabilizing elements (11) onto the two halves (6, 7) which are distributed over a surface area thereof which, when the two halves (6, 7) are joined together, mutually engage in or lie on top of one another.

5. A plastic board, comprising:
    an injection-molded first half (6), which includes at least an upper side (1) of the plastic board,
    an injection-molded second half (7), which includes at least an underside (2) of the plastic board, and the injection-molded first and second halves being joined together with at least one cavity and channels (10) are formed between the two halves (6, 7),
    the first and second halves abut against one another peripherally to define an edge surface (3),
    a separate connecting component (5) of injection molded plastic that is injected between the two halves (6, 7) and at least partially fixes the two halves (6, 7) to one another, and
    the connecting component is injected into said channels such that the channels (10) are filled by the connecting component (5).

6. The plastic board as claimed in claim 5, wherein the two halves (6, 7) at least partially abut against one another in a region of the edge surface (3) of the plastic board and thereby form a web (8), which substantially extends peripherally along the edge surface (3) and delimits at least one cavity between the two halves (6, 7) outwardly toward the edge surface (3).

7. The plastic board as claimed in claim 6, wherein the connecting component (5) is separately injection molded at least into a region of the edge surface (3) peripherally onto the substantially peripheral web (8), to outwardly seal the at least one cavity between the two halves (6, 7).

8. The plastic board as claimed in claim 5, wherein the two halves (6, 7) are provided with stabilizing elements (11), which are distributed over a surface area thereof, and in each case mutually engage in or lie one on top of one another.

9. The plastic board as claimed in claim 8, wherein the stabilizing elements (11) of the two halves (6, 7), engaging in one another, are at least one of pressed together or connected to one another in a material-bonded manner, in order to fix the two halves (6, 7) to one another.

10. The plastic board as claimed in claim 5, wherein the connecting component (5) is made of a different plastic material than a material of at least one of the two halves (6, 7).

* * * * *